INVENTOR.
NICHOLAS A. BEGOVICH,
BY NORMAN H. ENENSTEIN,
ATTORNEY.

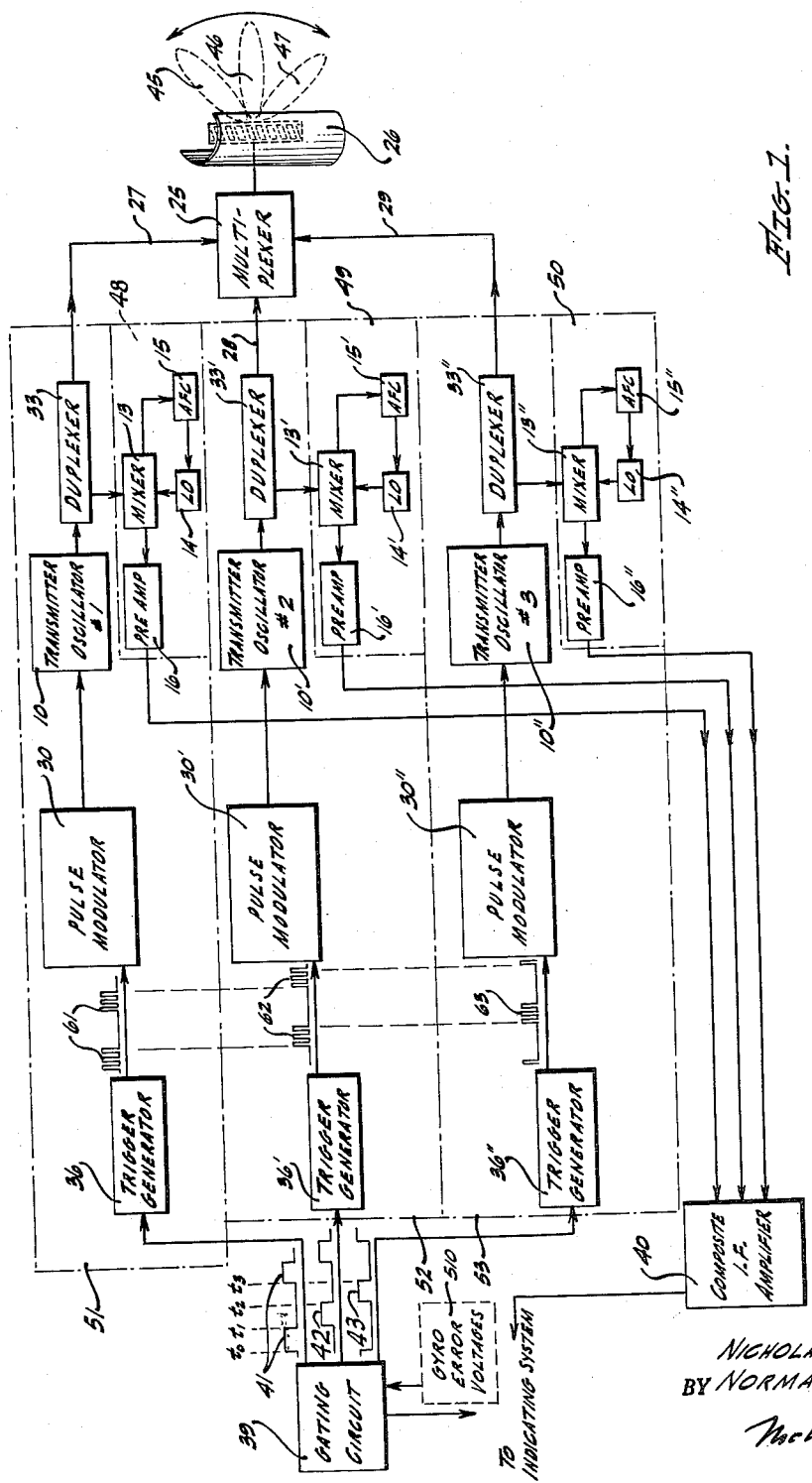

Jan. 16, 1962 N. A. BEGOVICH ET AL 3,017,630
RADAR SCANNING SYSTEM
Filed Dec. 19, 1952 6 Sheets-Sheet 3

INVENTOR.
NICHOLAS A. BEGOVICH,
BY NORMAN H. ENENSTEIN,

Nicholas T Vuha
ATTORNEY.

Jan. 16, 1962 N. A. BEGOVICH ETAL 3,017,630
RADAR SCANNING SYSTEM
Filed Dec. 19, 1952 6 Sheets-Sheet 4
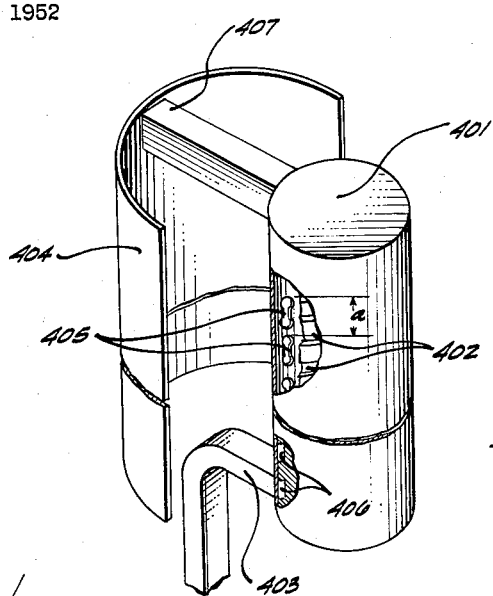
FIG. 5.
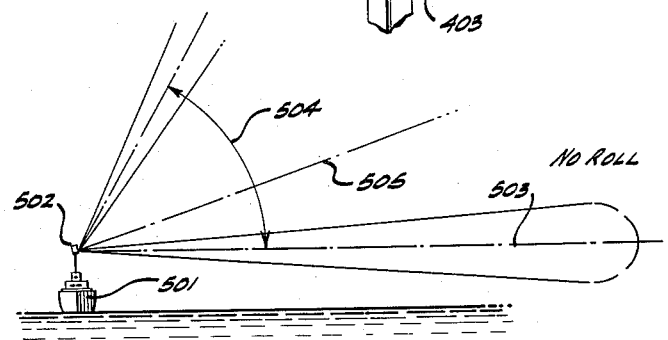
FIG. 6.
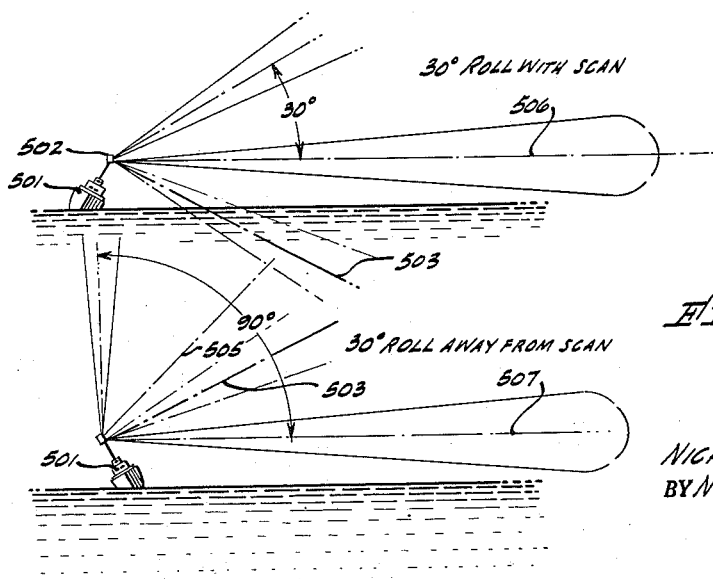
FIG. 7.
FIG. 8
INVENTOR.
NICHOLAS A. BEGOVICH,
BY NORMAN H. ENENSTEIN,
Nicholas T Voha
ATTORNEY.

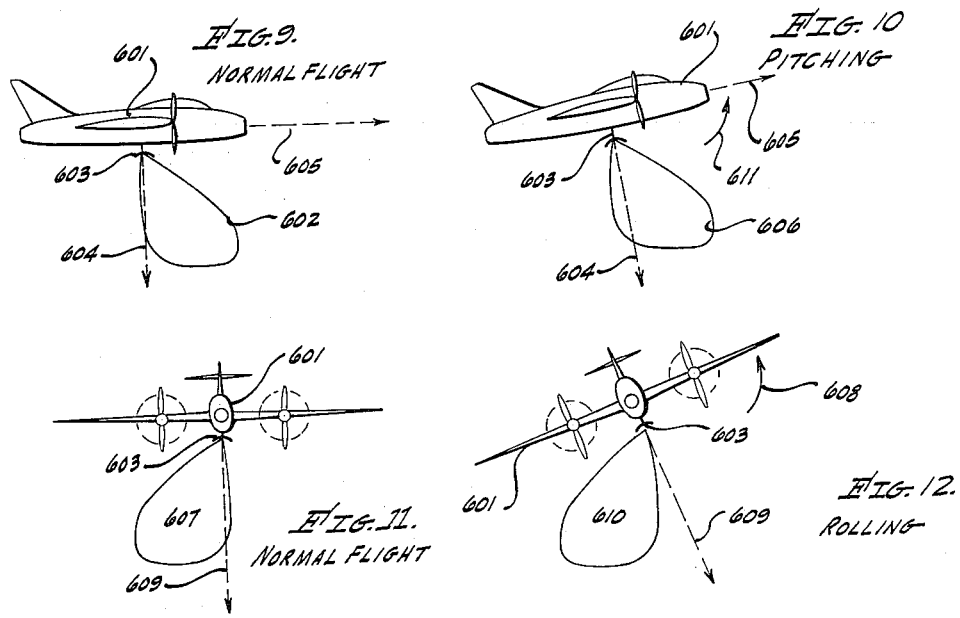
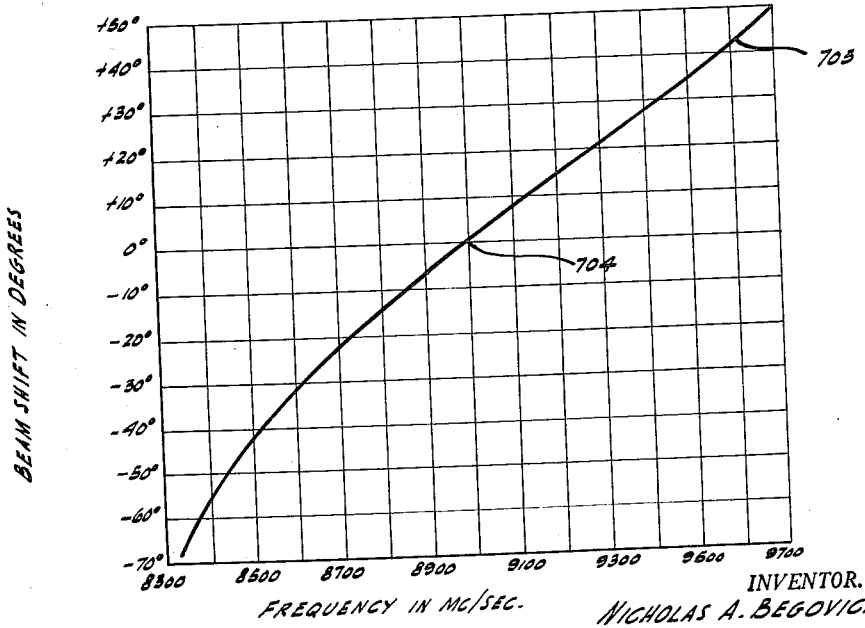
FIG. 13.

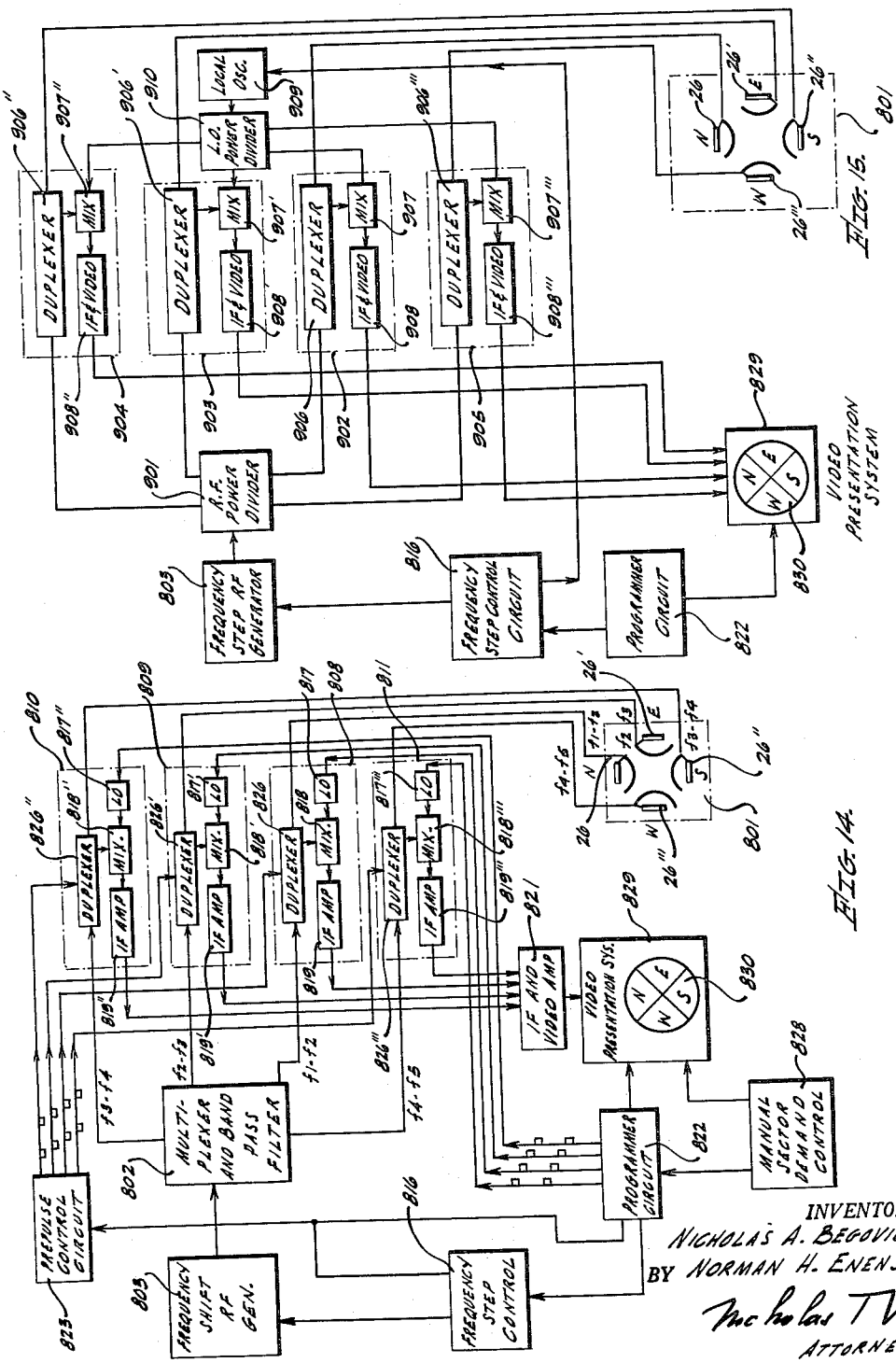

3,017,630
RADAR SCANNING SYSTEM
Nicholas A. Begovich and Norman H. Enenstein, Los Angeles, Calif., assignors, by mesne assignments, to Hughes Aircraft Company, a corporation of Delaware
Filed Dec. 19, 1952, Ser. No. 327,018
15 Claims. (Cl. 343—17.1)

This invention relates to systems for scanning a predetermined area with a radar beam and more particularly to apparatus for generating, transmitting and scanning an area with a microwave radar beam without requiring movement of the radar beam transmitting antenna.

In radar systems, scanning of any given area by a beam of radiant energy transmitted by a radar antenna is generally accomplished by mechanical movement of the radar antenna structure to direct the beam of energy transmitted by the radar antenna in a predetermined scanning pattern over the area. The scanning pattern is usually repeated in a cyclic manner. The speed with which the antenna structure may be moved through a single scanning cycle, and the repetition rate at which the scanning pattern recurs is limited by the mechanical apparatus employed to move the radar antenna structure. Although such apparatus can provide rapid rotation or oscillation of antenna structure over a sector of limited angle, at the very high speeds necessary to obtain rapid scanning to provide the required information, the mechanical apparatus normally has a short life.

Various antenna systems have been proposed to accomplish scanning of an area in space by a radar beam without motion of the antenna system radiating such a beam. The proposed systems utilize certain directive properties of linear arrays of radiating antenna elements. While the overall structure incorporating the linear array of these known systems is stationary, some portion of the antenna system must be moved.

The directive properties of linear arrays are further utilized in completely non-mechanical systems for causing a radar beam to scan a predetermined area. The beam of energy radiated by a linear array of radiating elements or radiators is transmitted in a direction that is a function of the actual spacing $a$ of the radiators with respect to one another, and also a function of the electrical spacing $s$ of the radiators along the transmission line that interconnects them. The number of radiating elements in an array and the distance between them in space may be adjusted to provide a particular directivity and sharpness of the radiated beam. The electrical spacing of the radiators along the transmission line determines the phase relationship of the energy radiated from each radiating element of the array with respect to an adjacent radiating element for any particular frequency of the energy exciting the array. As the relative phase shifts, due to a change in frequency of the exciting energy, the beam radiated from the linear array will rotate over an angle with respect to a direction perpendicular to the alignment plane of the linear antenna array. By varying the ratio $s/a$ the angle of rotation obtained for any selected change in frequency may be controlled.

Earlier proposed systems made use of the fact that a linear antenna array of radiator elements excited with radio-frequency energy of changing or varying frequency will radiate a beam of varying direction. If the frequency of the exciting energy changes over an appropriate range, and at a predetermined repetition rate, the radiated beam will follow a scanning pattern determined by both the change in frequency and by its rate of change.

An electronic system for scanning an area with a radar beam without motion of the antenna, accordingly, includes an antenna array having the directive properties of linear arrays as outlined above, transmitter apparatus for exciting the antenna with microwave energy that varies in frequency with time control apparatus for controlling the frequency variation of the transmitter in accordance with a predetermined pattern, and receiving apparatus associated with the transmitter apparatus and fed by the control apparatus of the transmitter.

U.S. Patents 2,403,729 and 2,409,944, granted to A. V. Loughren, relate to the above-mentioned non-mechanical space scanning system and disclose means for exciting an antenna array with energy varying in frequency with time in a saw tooth fashion. Loughren Patent 2,403,729 discloses the receiver of the system. The frequency to which the receiver responds at any instant varies continuously and concurrently with the saw tooth frequency variation effected at the transmitter. It is obvious that during the interval between successive pulses transmitted by the antenna, the frequency to which the receiver responds will continue to change in synchronism with the linear saw tooth frequency variation at the transmitter. The echo pulses which are received by the receiver are delayed with respect to the transmitted pulses. Hence, the receiver, which will be responsive to some frequency adjacent to that which had just been transmitted, is receptive to some direction other than the direction from which the transmitted signal had just been reflected.

In accordance with the invention, this difficulty is overcome by maintaining the radar receiver responsive to the frequency of the transmitted energy in order that the direction of reception shall correspond to the direction of transmission. The frequency of the transmitted energy remains constant for some time and may then be changed, after a predetermined interval of time, to some adjacent frequency in discrete steps to direct the beam of transmitted energy in the desired direction for each step. The system is made continuously operative at each frequency step for the duration of the predetermined interval.

Another desirable feature of the system of the invention is the ability to control the angle over which the antenna array scans as a function of the range of frequencies over which the system is operated.

In the present invention, a system is provided which permits electronic control of the scanning action of a radar beam through the application of microwave energy to a linear antenna array having special directive properties. The microwave energy, developed at the transmitter, is varied in frequency in accordance with a predetermined program or pattern, whereby the frequency is changed with time in a series of steps of increasing or decreasing frequency. The frequency is maintained at each step for a predetermined period of time. The number of steps is predetermined over a sweep or scanning cycle.

Receiving circuits included in the system of the invention are maintained so as to be responsive at any instant to the frequency of the energy transmitted by the antenna. The frequency step system of scanning of the present invention has certain basic advantages over other conventional techniques. One advantage, disclosed above, is the direct control of the radar receiver responsiveness. Another, is that no moving parts are required when the energy of step-wise varying frequency is applied to the antenna array to cause the radiated beam of energy to scan a predetermined sector. Wider scan angles at greater scanning repetition rates are possible, partly through control of the beforementioned $s/a$ ratio, than can be achieved with practical mechanical systems of scanning. In the disclosed frequency-step scanning system, microwave energy varying in frequency in a predetermined step-wise sequence is applied to a linear antenna array so as to vary the direction of the beam with each frequency step. The frequency-step scanning radar system may be employed in airport surveillance where the use of fixed antenna structures would considerably reduce construction problems set up by the requirements of heavy motor-driven apparatus.

The frequency-step scanning system may also be employed to stabilize the direction of the beam developed by a radar antenna mounted in a pitching and rolling aircraft or ship. It may further be used to electronically stabilize the pattern of scanning of a beam in one scanning coordinate, while the beam is mechanically directed in another coordinate, to compensate for deviations from the scanning pattern due to roll or pitch.

One system for generating a wave having step-wise varying frequency includes a separate pulsed magnetron or other transmitting oscillator for each frequency-step to be applied to the directional antenna array. The magnetron oscillators are triggered individually in a predetermined sequence. The output energy of the magnetrons is applied to the antenna array through a multiplexer. A receiving system responsive to the transmitter frequency is coupled to each transmitter through a duplexer. The coupling of receiver and transmitter is accomplished in the manner well known in the radar art. Each receiver and transmitter combination is coupled to the antenna through the multiplexer.

Another system by means of which energy may be generated in a series of frequency steps and applied to the antenna array includes a high-frequency wide-band transmitting oscillator, the frequency of which may be changed upon the application of a control voltage having a "staircase" wave shape. Each "step" of the voltage wave controls the wide-band oscillator so as to generate output energy of a different frequency. Coupled to the oscillator is a multiple discriminator incorporating a system of waveguides selectively responsive to as many frequencies as are generated by the wide-band oscillator in response to the individual steps of the voltage wave. The discriminator provides an automatic frequency control voltage which is fed back to the staircase voltage generating means to maintain the wide-band high-frequency oscillator at the predetermined frequency corresponding to a particular step for the duration of each step of the staircase voltage wave. By heterodyning the energy from the transmitting oscillator with the output wave of appropriate crystal-controlled oscillators and applying the signals to a wide-band output amplifier, transmitting and receiving functions are carried out.

Another system that may be employed to generate microwave energy in frequency steps to be applied to a scanning radar antenna may include a pair of oscillators stabilized by automatic frequency control circuits, and incorporating another system for heterodyning the energy obtained from the controlled microwave oscillators with the output energy of crystal-controlled oscillator circuits. In conjunction with appropriate receiving apparatus, these circuits are gated on and off as required for the operation of the radar system in discrete frequency steps.

A linear antenna array having directional characteristics may be coupled to any of the embodiments of the system of this invention disclosed above and will change its radiation angle in response to the frequency of the energy applied to the array. The direction of rotation of the scanning beam is from the straight ahead direction towards the direction away from the input end of the antenna array. This change of the scanning angle occurs in response to a frequency shift in the direction of increasing frequency. A shift in the direction of decreasing frequency results in a change of the scanning angle in the opposite direction.

By combining four stationary, directionally sensitive linear antenna arrays and associated generating systems, according to this invention, each being controlled so as to sequentially scan one of the four quadrants surrounding a radar installation, azimuth scanning is accomplished over an angle of 360°.

It is an object of this invention to provide a generator for a scanning radar system in which the frequency of the generated energy is changed in a series of steps of increasing or decreasing frequency, whereby the direction of the beam of energy transmitted by the system is a function of the frequency during each step.

It is a further object of this invention to provide means for generating high-frequency energy in a succession of frequency steps suitable for a frequency-step scanning radar system.

Another object of this invention is to provide a microwave generating system for a scanning radar system located in a ship or aircraft, subject to rolling and pitching, and responsive to positional changes of the ship or aircraft in which the system is located, to control the radiation direction of a radar beam, so that the radar beam scanning pattern is electrically stabilized to maintain a predetermined scanning pattern in space.

Still another object of this invention is to provide a frequency-step scanning radar system including transmitting apparatus and receiving apparatus coordinated for their operation, so that the receiver is responsive to echoes from the same direction in which the transmitting beam has been radiated.

Still a further object of this invention is to provide a radar system scanning an area surrounding a radar installation over an angle of 360° by application of a frequency-step scanning technique.

The novel features of the invention will become clear from the foregoing discussion, the detailed description of the figures which follows, and the appended claims. The organization of the invention and its operation, along with further objects and advantages of its use, will be understood by referring to the following description in connection with the accompanying drawings, in which:

FIGURE 1 is a block diagram of an embodiment of the frequency-step scanning radar system of the invention;

FIGURE 5 is a perspective view of a form of antenna comprising a linear array of slots which may be employed with the system of this invention;

Figure 2:
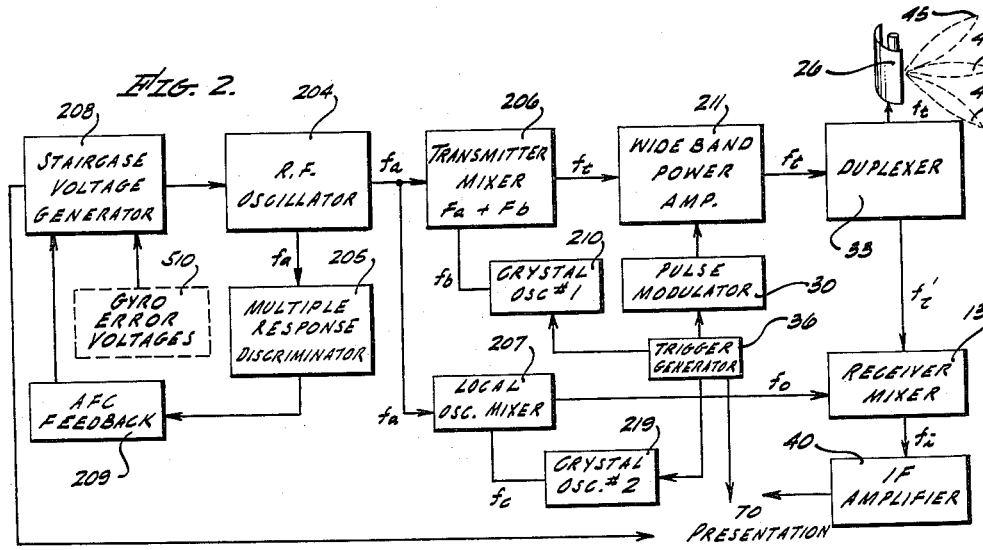
FIGURE 2 is a block diagram of another embodiment of this invention.

FIGURES 6, 7, and 8 are diagrammatic illustrations of a ship upon which is mounted a radar system generating a beam of energy wherein the direction of the beam of energy is stabilized with respect to space when the ship rolls;

FIGURES 9, 10, 11, and 12 illustrate an aircraft engaged in ground mapping by radar where the direction of the radar beam is stabilized with respect to space under conditions of pitch or roll of the aircraft;

FIGURE 13 is a graph of the angular shift in beam direction plotted with respect to frequency;

FIGURE 14 is a block diagram of further modification of this invention applied to scanning over an angle of 360°; and FIGURE 15 is a block diagram of another modification which permits simultaneous scanning of the four quadrants of the area surrounding the radar transmitter.

Referring now to the drawings and particularly to FIG. 1, there is shown an embodiment of the present invention, including three complete transmitter-receiver systems generally designated by dotted blocks 51, 52, and 53. Each transmitter-receiver system 51, 52, 53 operates individually at a different predetermined frequency and the three systems are sequentially controlled by a common or master gating circuit 39. The three transmitter-receiver systems 51, 52, 53 are coupled through a common multiplexer 25 to a common antenna system 26 having directive properties determined by the frequency of the energy applied to it, as briefly disclosed hereinabove and as will be described in further detail hereinafter.

The first transmitter-receiver system 51, operating at a first frequency $F_1$, includes a first transmitter oscillator 10 which may include a magnetron, a klystron, a travelling wave tube, or which may be any other type of high-frequency oscillator. Transmitter oscillator 10 is coupled to common multiplexer 25 through a duplexer 33. Gating circuit 39 is coupled to a trigger generator 36 which, in turn, is coupled to a pulse modulator 30. Pulse modulator 30 is coupled to transmitter oscillator 10. Under the control of gating circuit 39, trigger generator 36 is enabled to trigger pulse modulator 30 to pulse modulate oscillator 10. A first receiver, generally indicated by block 48 associated with transmitter oscillator 10, is responsive to the frequency of operation of transmitter oscillator 10, and includes a mixer 13, a local oscillator 14, an automatic frequency control (AFC) circuit 15 connected in a loop and an intermediate (IF) frequency pre-amplifier 16 coupled to mixer 13. AFC circuit 15 maintains the local oscillator 14 at a predetermined frequency of operation.

Receiver 48 is also coupled to multiplexer 25 through duplexer 33, as is transmitter oscillator 10. Duplexer 33 is of conventional construction and comprises elements for automatically and alternately connecting a waveguide path 27 between transmitter oscillator 10 and multiplexer 25 for transmission of pulsed energy at each instant pulse modulator 30 applies a pulse to oscillator 10, and between multiplexer 25 and receiver mixer 13 for reception of echoes during the time interval between the pulses. The details of construction and operation of a duplexer are well known in the radar art so that further description here is not necessary.

The second transmitter-receiver system 52, operating at a second frequency $F_2$, also incorporates a transmitter oscillator 10' which may be identical to oscillator 10; however, the frequency $F_2$ is higher than $F_1$. Transmitter oscillator 10' is coupled to common multiplexer 25 through a duplexer 33'. Gating circuit 39 is also coupled to a trigger generator 36' which, in turn, is coupled to a pulse modulator 30'. Pulse modulator 30' is coupled to transmitter oscillator 10'. Under the control of gating circuit 39, trigger generator 36' is enabled to trigger pulse modulator 30' to pulse modulate oscillator 10'.

A receiver 49 associated with transmitter oscillator 10' is responsive to the frequency of operation of transmitter oscillator 10' and incorporates a mixer 13', a local oscillator 14', and AFC circuit 15', and an IF pre-amplifier 16'. AFC circuit 15' maintains local oscillator 14' at a predetermined frequency of operation. Receiver 49 is coupled to multiplexer 25 through duplexer 33'. Duplexer 33' may be similar to duplexer 33 and automatically switches a waveguide path 28 between transmitter oscillator 10' and multiplexer 25 for transmission, when pulse modulator 30' applies pulses to oscillator 10', and between multiplexer 25 and receiver mixer 13' for reception of echoes between successive pulses.

The third transmitter-receiver system 53, operating at a third frequency $F_3$, which is higher than the frequency $F_2$, incorporates a transmitter oscillator 10'' which may again be similar to oscillator 10. Transmitter oscillator 10'' is coupled to common multiplexer 25 through a duplexer 33''. Gating circuit 39 is also coupled to a trigger generator 36''. Trigger generator 36'' is coupled to a pulse modulator 30'' which, in turn, is coupled to transmitter oscillator 10''. Under the control of gating circuit 39, trigger generator 36'' is enabled to trigger pulse modulator 30'' to pulse modulate oscillator 10''.

A receiver 50 associated with transmitter oscillator 10'' is responsive to the frequency of operation of transmitter oscillator 10'' and incorporates a mixer 13'', a local oscillator 14'', an AFC circuit 15'', and an IF pre-amplifier 16''. AFC circuit 23 maintains local oscillator 19 at a predetermined frequency of operation. Receiver 50 is coupled to multiplexer 25 through duplexer 33''. Duplexer 33'' again automatically switches a waveguide path 29 between transmitter oscillator 10'' and multiplexer 25 for transmission when pulse modulator 30'' applies pulses to oscillator 10'', and between multiplexer 25 and receiver mixer 16'' for reception of echoes between the pulses.

IF pre-amplifiers 16, 16', 16'' are each coupled to a common composite IF amplifier 40. Composite IF amplifier 40 has an output connection to the display indicating system of the radar where visual indications of the echoes received by receivers 48, 49, or 50, respectively, are displayed on an indicator which may be a cathode ray tube. Gating circuit 39 also has an output connection to the display indicating system as indicated by which pulses from gating circuit 39 are applied to the indicating system for controlling the echo display position in synchronism with the instantaneous direction of transmission. Multiplexer 25 may be similar to and may operate in the manner of that described in an article by W. D. Lewis and L. C. Tillotson, entitled "A Non-Reflecting Branching Filter for Microwaves," appearing in the Bell System Technical Journal, Volume 27, #1, pp. 83–95, January 1948.

Figure 1A:
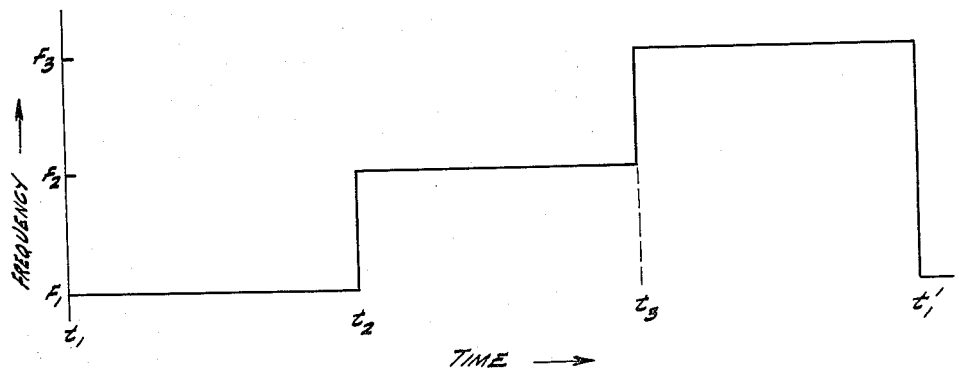
FIGURE 1a is a graph illustrating the change in frequency with respect to time of the energy developed by the system of FIG. 1.

The operation of the frequency step RF generating system of FIG. 1 will be more clearly understood with reference to FIGS. 1 and 1a.

It is the purpose of the system of this invention, one embodiment of which is shown in FIG. 1, to generate RF energy at a plurality of frequencies such as $F_1$, $F_2$, $F_3$ in succession whereby, as has been stated above, $$F_1 \; F_2 \; F_3 \tag{1}$$

While the operation of the system of this invention will be explained for only three frequencies, as illustrated in FIG. 1, it may be readily understood that any predetermined number of similar transmitter-receiver combinations such as 51, 52, 53 may be employed to generate energy at a corresponding number of frequencies which may be used to excite an antenna system, such as 26, to transmit the energy in a beam having a predetermined direction such as illustrated at 45, 46, 47 respectively, for each frequency.

In FIG. 1a a curve of the frequencies $F_1$, $F_2$, $F_3$ with respect to time is shown to indicate the operation of the three transmitter-receiver combinations 51, 52, 53, each at its operating frequency $F_1$, $F_2$, or $F_3$, over three identical predetermined intervals of time.

The operation of each of the transmitter-receiver systems 51, 52, 53 is similar, except that each operates at its individual frequency and that they are energized in time sequence. The time sequence is established by the operation of master gating circuit 39, which incorporates conventional circuits to produce three pulse trains 41, 42, 43 indicated in FIG. 1. The duration of a pulse 41 (FIG. 1) corresponds to the time interval $t_1$ to $t_2$ (FIG. 1a) during which frequency $F_1$ is generated. The duration of a pulse 42 corresponds to the time interval $t_2$ to $t_3$ during which frequency $F_2$ is generated while the duration of a pulse 43 corresponds to the time interval $t_3$ to $t_1'$ during which frequency $F_3$ is generated. A cycle of operation of the gating circuit 39, therefore, will be completed when a pulse 41, followed by a pulse 42, and by a pulse 43, have been generated. Gating circuit 39, through three individual output circuits, applies pulse train 41 to transmitter-receiver system 51, pulse train 42 to transmitter-receiver system 52 and pulse train 43 to transmitter-receiver system 53.

For the duration of a pulse 41 applied to trigger generator 36, trigger generator 36 develops a series of trigger pulses 61, shown in FIG. 1, having a predetermined repetition rate at least one order of magnitude greater than the repetition rate of pulses 41. The trigger pulses 61 are impressed on pulse modulator 30 which, in turn, pulse-modulates first transmitter oscillator 10 during the train of pulses 61, which continues during pulse interval 41. Transmitter-receiver system 51 is then operative to transmit the first pulsed wave at the frequency $F_1$. Transmitter oscillator 10 generates radio frequency energy during each pulse 61, which is impressed on multiplexer 25 through duplexer 33 and waveguide path 27. The radio frequency energy, through the multiplexer 25, is impressed on antenna 26, which transmits the energy in a beam 45. The direction of beam 45, upward as shown in FIG. 1, is determined by the frequency $F_1$ and the structure of the antenna 26, as hereinafter disclosed.

By virtue of the operation of duplexer 33, during the interval between successive pulses 61, receiver system 48 will receive echoes of the beam 45 that may be impressed on the antenna from targets in space located in the direction to which beam 45 is directed from the antenna. Receiver 48 is responsive to the frequency $F_1$ of the energy generated by transmitter oscillator 10. The receiver 48 is maintained responsive to the frequency $F_1$ by the action of AFC circuit 15 controlling local oscillator 14. The operation of such an AFC circuit is well-known and need not be further described here. A signal, corresponding to the received echo pulses, is applied to IF pre-amplifier 16. An amplified version of these echo signal pulses at the intermediate frequency is applied to composite IF amplifier 40.

Transmitter-receiver systems 52 and 53 each incorporates a set of components identical with those in transmitter-receiver system 51. Accordingly, each of the three transmitter-receiver systems 51, 52, 53 operates in the manner described above for the system 51. A cycle of operation of the system of this invention, shown in FIG. 1, includes the following sequence of events: gating circuit 39, at a time $t_1$, generates a pulse 41 which is applied to trigger generator 36. For the duration of pulse 41 a series of trigger pulses 61 is applied to trigger pulse modulator 30 thereby to pulse-modulate first transmitter oscillator 10. For each of the pulses 61 transmitter oscillator 10 generates radio frequency energy at frequency $F_1$ which is applied through duplexer 33 and multiplexer 25 to antenna 26. Antenna 26 transmits the energy in a beam 45, having an upward direction. In the periods between the pulses 61, when transmitter oscillator 10 is momentarily inoperative, any targets located in the path of beam 45 reflect echoes of the energy transmitted at frequency $F_1$ back to antenna 26. The echo signals are applied through multiplexer 25 and duplexer 33 to receiver 48 and, thence, to composite IF amplifier 40, where the echo pulses are amplified and may be followed by a demodulator, not shown, to provide signals for application to the indicating system of the scanning radar system where these signals are displayed to indicate the direction, location, and range of the target.

The operation of transmitter-receiver system 51 continues until time $t_2$, at which time pulse 41 is terminated and pulse 42 is initiated by components of gating circuit 39. Pulse 42 is applied to trigger generator 36′ in transmitter-receiver system 52. Trigger generator 36′ develops trigger pulses 62, which trigger pulse modulator 30′ to pulse-moduatle transmitter oscillator 10′. During each pulse 62, oscillator 10′ generates energy at a frequency $F_2$ which is applied to antenna 26 through duplexer 33 and multiplexer 25. The antenna transmits the energy at frequepncy $F_2$ in a beam 46, which is directed straight ahead from the antenna. During the intervals between pulses 62, receiver 49 receives pulsed echo signals from any targets in space in the direction of beam 46 which may have been illuminated by the beam and, again, the pulsed echo signals are applied to composite IF amplifier 40, where they are amplified. From composite IF amplifier 40 the echo pulse signals are applied to the indicating system for presentation on the indicator display.

The operation of transmitter-receiver 52 continues until time $t_3$ when pulse 42 is terminated and pulse 43 is initiated in gating circuit 39. Pulse 43 is applied to transmitter-receiver system 53 in which the pulse 43 is impressed on trigger generator 36″. Trigger pulses 63 are generated to pulse-modulate oscillator 10″ which ultimately results in a beam 47 of pulsed RF energy at frequency $F_3$ heretofore described. In the intervals between successive pulses 63, receiver 50 is operative to receive echoes from targets illuminated by the beam of energy 47 as heretofore described.

The indicating system is also controlled by gating circuit 39 to position the indicator display in synchronism with the predetermined directions of the antenna beam 45, 46, 47.

In the system of FIG. 1, above described, three separate oscillators are employed, each operating at a different frequency and at different times under the control of a master gating circuit, to generate in succession RF energy in a series of steps each having a different constant frequency. Another embodiment of a system for generating RF energy in a series of discrete steps of different frequencies is illustrated in the block diagram of FIG. 2. The system as disclosed in FIG. 2 differs basically from that of FIG. 1 in the employment of a single RF oscillator 204, capable of being varied in frequency, to generate different frequencies. Consequently, each of the three frequencies such as $F_1$, $F_2$, $F_3$, generated in the system of FIG. 1, is obtained by heterodyning the variable frequency RF oscillator 204 (at its several frequencies of operation) with fixed frequency waves obtained from crystal-controlled oscillators, as hereinafter disclosed.

Referring now to FIG. 2, RF oscillator 204 is capable of operation at several frequencies, and may, for example, be a klystron oscillator. The several frequencies of the energy generated result from different control voltages applied to a control element which is part of the oscillator 204. The control voltage is applied to oscillator 204 by a staircase voltage generator 208. Variable frequency oscillator 204 has three output circuits from which energy at an output frequency $f_a$ is applied to three circuits as described below. The three output circuits of oscillator 204 are coupled respectively to a multiple response discriminator 205, to transmitter mixer 206 and to local oscillator mixer 207. The mixers 206 and 207 may be travelling wave tubes or other vacuum tubes capable of mixing signals over a wide range of ultra-high or microwave frequencies. The energy at frequency $f_a$ applied to multiple response discriminator 205 is processed in a manner hereinafter described and a resultant voltage developed thereby is applied through an AFC feedback loop 209 to the staircase voltage generator 208 for providing a correction voltage to the staircase voltage generator in order to maintain the frequency of RF oscillator 204 at a constant frequency during each frequency step of the energy generated by the oscillator.

Transmitter mixer 206 is coupled to a wide-band power amplifier 211 which is coupled through duplexer 33, to antenna 26. Duplexer 33 and antenna 26 are similar to those previously described in connection with the system of FIG. 1. A trigger generator 36 is coupled to pulse modulator 30 which, in turn, is coupled to wide-band power amplifier 211. Trigger generator 36 is also coupled to a first crystal oscillator 210 and to a second crystal oscillator 219. First and second crystal oscillators 210, 219, include each the necessary oscillator and multiplier circuits to provide energy at an output frequency $f_b$ from crystal oscillator 210, and energy at an output frequency $f_c$ from oscillator 219. The $$f_c - f_b = f_1 \qquad (2)$$

output circuit of oscillator 219 is coupled to local oscillator mixer 207. The output of oscillator 210 is coupled to transmitter mixer 206.

Receiver mixer 13 has two input circuits, one of which is coupled to the output circuit of local oscilaltor mixer 207 while the second is coupled to the duplexer 33. The output circuit of receiver mixer 13 is coupled to IF amplifier 40. The output circuit of IF amplifier 40 is coupled to the display indicating system of the radar, where indications of the echoes received by the receiver mixer through duplexer 33 are impressed on the indicator which may be a cathode ray tube. Another output circuit of trigger generator 36 is also coupled to the display indicating system for controlling and synchronizing the display with the operation of the system. Staircase voltage generator 208 has another output connected to the display presentation system for synchronizing the positioning of the display with respect to the transmitted beam direction.

The operation of the system illustrated in FIG. 2 may be explained by considering first the operation of variable frequency oscillator 204. Oscillator 204 may include a klystron or any other type of oscillator which is capable of varying its frequency of operation upon the application of a variable voltage to a control element of the oscillator. This variable voltage is developed by the staircase voltage generator 208 which includes its own timing network. The output voltage wave of the staircase generator 208 is similar to the curve shown in FIG. 1a. RF oscillator 204, upon the application of the staircase voltage wave from generator 208, responds by generating a different frequency for each voltage level or "step" of the staircase voltage wave. For example, for the time interval $t_1$ to $t_2$, in which the lowest step of the staircase voltage wave is being produced, RF oscillator 204 generates a first frequency $f_{a1}$. During the interval $t_2$ to $t_3$, when the second step of the output voltage wave of staircase voltage generator 208 is produced, the RF oscillator 204 generates a second frequency $f_{a2}$. During the interval $t_3$ until the beginning of a new cycle initiated at $t_1$, when a third step of the output wave of the staircase voltage generator is applied to RF oscillator 204, RF oscillator 204 generates a third frequency $f_{a3}$.

$$f_{a1}\ f_{a2}\ f_{a3} \tag{3}$$

For the purposes of this discussion, frequencies $f_{a1}$, $f_{a2}$, $f_{a3}$ will be generally designated by frequency $f_a$.

Figure 3:
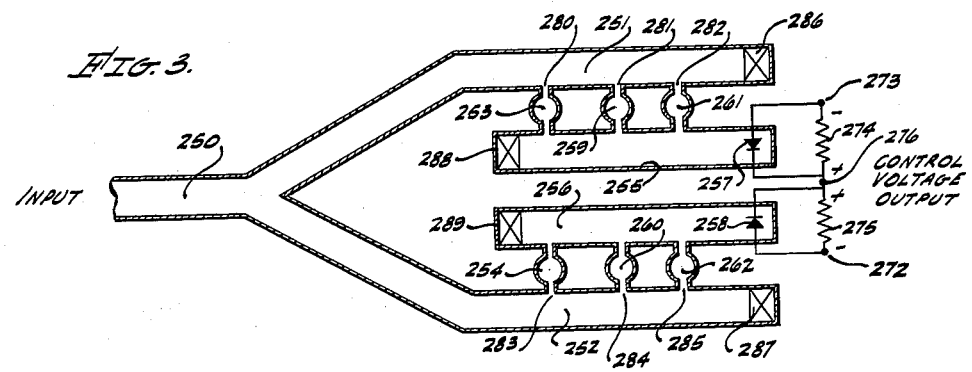
FIGURE 3 is a schematic illustration of the discriminator and associated circuits included in the system of FIG. 2.
Figure 3A:
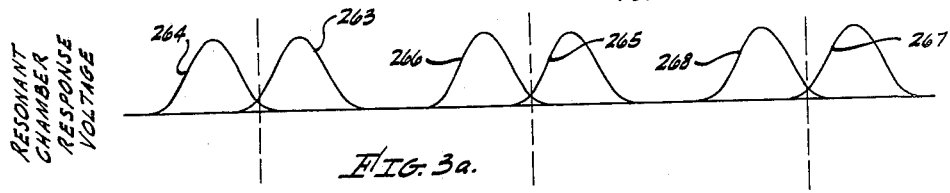
FIGURES 3a and 3b are graphs of the output voltage with respect to frequency of the discriminator shown in FIG. 3.
Figure 3B:
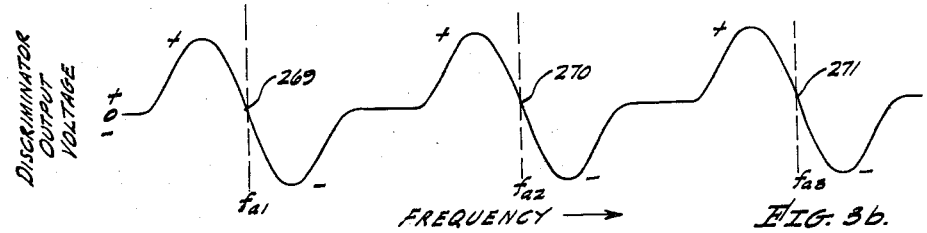

Energy at frequency $f_a$ is applied from oscillator 204 to transmitter mixer 206, to local oscillator mixer 207, and to multiple response discriminator 205. Multiple response discriminator 205, hereinafter designated discriminator 205, develops a correction voltage in response to any deviation of the oscillatory wave from a center frequency $f_a$ within predetermined limits. The correction voltage is applied through AFC feedback network 209 to the staircase voltage generator 208 to maintain the frequency of the energy generated by RF oscillator 204 during any step of the staircase voltage generator at the proper center frequency $f_a$. Each voltage level is corrected above and below its nominal voltage to shift the oscillator frequency higher or lower as necessary to maintain the correct frequency. The details of construction of discriminator 205 are illustrated in FIG. 3 and waveforms of its operation are shown in FIGS. 3a and 3b, which will be described in detail hereinafter.

Energy at a frequency $f_a$ is applied to transmitter mixer 206. There is also applied a wave of frequency $f_b$ from first crystal oscillator 210. The frequency $f_a$, in the transmitter mixer 206, is additively heterodyned with frequency $f_b$ to produce a summation frequency $f_t$.

$$f_a + f_b = f_t \tag{4}$$

Energy at frequency $f_t$ is now applied to wide-band power amplifier 211. Wide-band power amplifier 211 may be of the klystron amplifier type and is pulse modulated by pulse modulator 30 at some predetermined repetition rate set up by trigger generator 36. The repetition rate is high compared to the duration of the time interval $t_1$ to $t_2$. Trigger generator 36, in addition to impressing trigger pulses on the pulse modulator 30, also provides pulses which are applied to first crystal oscillator 210. During the intervals between successive pulses applied to pulse modulator 30 and to first crystal oscillator 210 pulses of opposite polarity are developed which are applied to second crystal oscillator 219. Hence, crystal oscillator 210 is excited simultaneously with pulse modulator 30 while during the intervals between successive pulses, applied to modulator 30 and oscillator 210, second crystal oscillator 219 is energized. Consequently, first crystal oscillator 210, and second crystal oscillator 219 operate alternately, one being inoperative while the other is operative.

Amplified energy at frequency $f_t$ is applied from wide-band power amplifier 211 through duplexer 33 to antenna 26 for transmitting a beam in the direction indicated at 45, 46, or 47, depending upon which of the frequencies $f_{a1}$, $f_{a2}$, $f_{a3}$, is being generated by RF oscillator 204. The resulting frequencies ($f_t$) will correspond to $F_1$, $F_2$, $F_3$, similar to the frequencies of the energy generated by the system of this invention disclosed in FIG. 1.

The operation of local oscillator mixer 207 is very similar to that of transmitter mixer 206. Energy at a frequency $f_a$ from RF oscillator 204 is applied to local oscillator mixer 207. Energy at the fixed frequency $f_c$ from second crystal oscillator 219 is also applied to local oscillator mixer 207. The frequencies $f_a$ and $f_c$ are additively heterodyned to produce a summation frequency $f_o$, each time crystal oscillator 219 is energized under the control of trigger generator 36.

$$f_a + f_c = f_o \tag{5}$$

Output energy at frequency $f_o$ from local oscillator mixer 207 is applied to receiver mixer 13. During the interval between pulses which actuate or render operative wide-band power amplifier 211 and coincidently with the operation of second crystal oscillator 219, duplexer 33 operates to permit echo pulses from targets located in the direction of the beams 45, 46, or 47, to be impressed on receiver mixer 13.

A symbol $f'_t$ has been assigned to distinguish the echo pulse frequencies ($f'_t$) from the transmitter output frequencies ($f_t$) which are actually identical.

$$f_t = f'_t \tag{6}$$

In the receiver mixer 13, frequencies $f_o$ and $f'_t$ are subtractively heterodyned to produce a difference frequency $f_i$ which is the intermediate frequency.

$$f_o - f'_t = f_i = f_c - f_b \tag{7}$$

It is to be noted that the actual difference in frequency between first crystal oscillator 210 and second crystal oscillator 219 is equal to the IF frequency $f_i$. Accordingly, since it is quite clear that, were these two crystal oscillators 210, 219 permitted to operate continuously, energy at the difference frequency $f_i$ would be developed which may overload the IF amplifier 40 despite the extensive shielding conventionally employed in such equipment. It is for the purpose of eliminating any other source of IF energy which may be likely to interfere with the IF energy developed in the receiver mixer 13, that the crystal oscillator 210, the ouput energy of which is applied to transmitter mixer 206, is preferably operated only for the duration of transmitter pulses while crystal oscillator 219, the output energy of which is applied to local oscillator mixer 207, is preferably operated only during the intervals between transmitter pulses when the receiver 13 is energized. The operation of the receiver incorporating receiver mixer 13, IF amplifier 40, and the display presentation system is similar to that which has been previously described in connection with the system of this invention in FIG. 1.

The multiple response discriminator 205, shown in detail in FIG. 3, delivers direct-current voltage having a polarity representative of the direction of the frequency deviation of the wave developed by oscillator 204 with respect to a plurality of predetermined center frequencies corresponding to frequency $f_{a1}$, $f_{a2}$, $f_{a3}$, and so forth, as generated by the system of FIG. 2. Discriminator 205 may be considered an assembly of waveguide comb filters. A section of waveguide 250 is bifurcated to provide waveguide forks 251 and 252. In the wall of fork 251, there is provided an opening 280 which couples the fork to output waveguide 255 through a resonant chamber 253 resonant at a predetermined frequency higher than $f_{a1}$. There is also disposed in the wall of fork 251 an opening 281 which couples a resonant chamber 259 to output waveguide 255. Resonant chamber 259 is resonant at a predetermined frequency higher than frequency $f_{a2}$. Further disposed in fork 251 is a third opening 282 coupling the waveguide fork 251 to output waveguide 255 through a resonant chamber 261. Resonant chamber 261 is resonant at a predetermined frequency higher than frequency $f_{a3}$.

Correspondingly, in the wall of fork 252, there are disposed openings 283, 284, 285 coupling the waveguide fork 252 to an output waveguide 256 through resonant chambers 254, 260, and 262, respectively. Resonant chambers 254, 260, and 262 are resonant respectively to a predetermined frequency lower than $f_{a1}$, lower than frequency $f_{a2}$, and lower than $f_{a3}$. Fork 251 is terminated in an impedance 286, while fork 252 is terminated in an impedance 287. Output waveguide 255 is provided with a terminating impedance 288 in one end and, in the opposite end, with a rectifier 257. Output waveguide 256 has a terminating impedance 289 disposed in one end and a rectifier 258 in its opposite end.

The rectifiers 257 and 258 are connected in a common output circuit comprising resistors 274 and 275 connected in series, the common junction 276 of the two resistors 274, 275, being connected to the cathode terminals of rectifiers 257, 258. The other end of resistor 274 is connected to the anode terminal of the rectifier 257 forming output terminal 273, and the other end of resistor 275 is connected to the anode end of rectifier 258 comprising output terminal 272.

Waveforms of the responses of the several branches of the multiple response discriminator 205, of FIG. 3, are shown in FIG. 3a. Waveforms of the overall voltage output response of the multiple response discriminator 205 are shown in FIG. 3b.

The curve of FIG. 3b illustrates the output voltage response between terminals 273 and 272 as a function of frequency deviations above and below the frequencies $f_{a1}$, $f_{a2}$, and $f_{a3}$, respectively. The output voltage between terminals 272, 273 is zero when the exact frequencies $f_{a1}$, $f_{a2}$, $f_{a3}$ are applied to waveguide 250 from RF oscillator 204 (FIG. 2) as shown in FIG. 3b at 269, 270, 271 respectively.

The operation of discriminator 205 may be clearly followed with reference to the waveforms of FIG. 3a showing the responses of the several chambers in terms of the voltage transmitted into the output waveguides 255 and 256 with respect to frequency. FIG. 3b shows the overall output voltage waveform of the discriminator. Energy applied to the input waveguide 250 of the discriminator 205 from RF oscillator 204 at any instant may include one of the frequency components $f_{a1}$, $f_{a2}$, or $f_{a3}$ or any frequency deviation above or below these frequencies. The center frequencies for which the resonant system of the discriminator is designed are $f_{a1}$, $f_{a2}$, $f_{a3}$. The energy applied to input waveguide 250 will divide equally between the two waveguide forks 251 and 252. As long as one of the frequencies $f_{a1}$, $f_{a2}$, or $f_{a3}$ is present, no output voltage appears across the output terminals 273 and 272. In response to the voltage step of the staircase voltage generator occurring during the interval $t_1$ to $t_2$, oscillator 204 of FIG. 2 generates the frequency $f_{a1}$. If for any reason the oscillator 204 should drift to oscillate at a frequency lower than $f_{a1}$, the resonant chamber 254, having a response as illustrated in FIG. 3a at 264, will permit the transmission of energy into output waveguide 256. This energy will be rectified by rectifier 258 providing an output voltage across the output terminals 273, 272. The voltage will have a positive polarity. The voltage amplitude will depend upon the extent of the frequency deviation within the limits of the response curve 264, (FIG. 3a) The positive voltage developed across terminals 272, 273 is applied to staircase voltage generator 208 through AFC network 209 to adjust the step voltage during the interval $t_1$ to $t_2$ so that the oscillator frequency $f_{a1}$ is maintained at its predetermined value. Should the frequency deviate to a value higher than the center frequency, then resonant chamber 253, having a response as illustrated by curve 263, in FIG. 3a, will permit energy to pass into output waveguide 255, which will be rectified by rectifier 257 to produce a negative voltage between terminals 273, 272 having an opposite polarity to that produced as a result of a frequency lower than $f_{a1}$. The negative output voltage at terminals 273, 272 is applied, as before, to the staircase voltage generator 208 to correct the voltage step of the staircase voltage generator 208, so as to return the oscillator frequency to the center frequency $f_{a1}$.

A similar action occurs for frequencies deviating from $f_{a2}$, wherein resonant chambers 259, 260 respond, respectively, to develop voltages illustrated by curves 266, 265 in FIG. 3a, thereby to provide correction voltages during the second step occurring in the interval $t_2$ through $t_3$ to maintain the center frequency $f_{a2}$ constant for the duration of this time interval. A similar action occurs for frequencies deviating from $f_{a3}$, wherein resonant chambers 261, 262 respond as illustrated by waves 268, 267, respectively, in FIG. 3a, to provide correction voltages during the third step occurring in the interval $t_3$ through $t'_1$ to maintain the center frequency $f_{a3}$ constant for the duration of the third time interval.

The operation of the discriminator of FIG. 3 for any one frequency of its plurality of responses is essentially similar to that of the well-known Conrad double-tuned discriminator. The resonant circuit of the discriminator 205, represented by resonant chamber 253 tuned higher than center frequency $f_{a1}$, and by resonant chamber 254 tuned lower than the center frequency $f_{a1}$, correspond to the parallel resonant circuits of the Conrad discriminator, one tuned above and the other one tuned below the center frequency. In the discriminator 205 there are three such double-tuned resonant circuits operating into discriminator rectifiers 257, 258 common to all three pairs of resonant chambers to maintain each of the three pairs of resonant chambers to maintain each of the three oscillator frequencies constant during each step of the operation of oscillator 204.

While the discriminator shown is responsive to the three frequencies only that are being used in the illustrative example, it will be readily apparent that any predetermined number of frequencies may be controlled through the use of a similar automatic frequency control arrangement in which there will be a discriminator such as 205 comprising as many pairs of resonant chambers as there are frequency steps generated by an oscillator such as oscillator 204.

Figure 4:
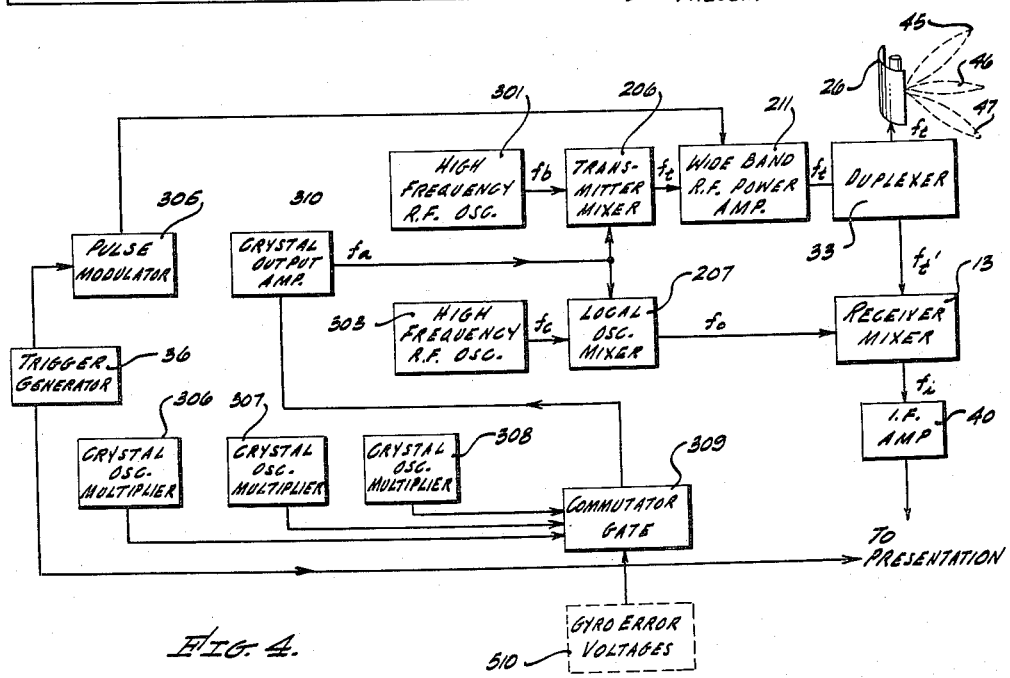
FIGURE 4 is a block diagram of still another embodiment of this invention.

Another embodiment of a generator of the invention, for producing high-frequency energy varying in a series of discrete frequency steps, is shown in block form in FIG. 4. The RF generator disclosed in FIG. 4 includes two fixed frequency oscillators 301 and 303 and a succession of crystal-controlled oscillators 306, 307, 308, each operating at a different fixed frequency in order to generate energy in a series of discrete steps of frequency, such as $F_1$, $F_2$, $F_3$, similar to the frequencies produced by the embodiments of the invention disclosed in FIGS. 1 and 2.

RF oscillators 301 and 303 are identical oscillators fixed tuned to different frequencies and may include a klystron or a travelling wave tube or may be other types of oscillators. They are operated, respectively, at frequencies $f_b$ and $f_c$ which are related as in Equation 2, heretofore disclosed in connection with FIG. 2. The three crystal oscillators 306, 307, 308 include each a multiplier chain and they are operated to produce energy at three separate output frequencies. The output circuits of the three crystal oscillator multiplier chains 306, 307, 308 are all coupled to a common commutator gate 309. The commutator gate 309 is coupled to a crystal output amplifier 310. The final output frequencies produced by the crystal oscillator multiplier chains are given the common designation $f_a$ corresponding to the similarly indicated frequency referred to in connection with the discussion of FIG. 2 and the individual frequencies corresponding to $f_a$ are again designated $f_{a1}$, $f_{a2}$, $f_{a3}$. The crystal output amplifier 310 is coupled to both transmitter mixer 206 and local oscillator mixer 207. The RF oscillator 301 is coupled to transmitter mixer 206, while RF oscillator 303 is coupled to local oscillator mixer 207. The output connections of transmitter mixer 206 to the antenna 26 and of local oscillator mixer 207 to receiver mixer 13 are the same as described in connection with FIG. 2.

The operation of the system of FIG. 4 in respect to the application of energy from transmitter mixer 206 through the wide-band power amplifier 211, the duplexer 33, to the antenna 26, resulting in the transmission of energy at frequencies $F_1$, $F_2$, $F_3$ in a directional beam 45, 46, 47, respectively, for each of the frequencies, is the same as that of the system disclosed in FIG. 2. The system of FIG. 4 differs mainly in the manner the three frequencies $F_1$, $F_2$, and $F_3$ are developed. Crystal oscillator and multiplier chain 306, comprising a quartz crystal oscillator and a multiplier chain for multiplying the crystal oscillator frequency by a predetermined factor to a final frequency $f_{a1}$, applies energy at the frequency $f_{a1}$ through commutator gate 309, during the time intervals the commutator gate gates the oscillator 306, to crystal output amplifier 310. Amplifier 310 is a wide-band amplifier capable of amplifying all frequencies that may be produced by the crystal oscillator multiplier chains such as 306, 307, 308. In a similar manner, crystal oscillator multiplier chain 307 produces energy at a frequency $f_{a2}$ and crystal oscillator multiplier chain 308 produces energy at a frequency $f_{a3}$. Commutator gate 309 may include a multivibrator and applies biasing pulses of a suitable polarity and amplitude to isolation amplifier circuits contained in the commutator. The commutator gate circuit 309 permits energy at only one of the frequencies $f_{a1}$, $f_{a2}$, $f_{a3}$ to be applied at any time to crystal output amplifier 310. The energy at any one of these frequencies, designated $f_a$ is applied to transmitter mixer 206, where it is heterodyned with the energy at frequency $f_b$ applied to transmitter mixer 206 from RF oscillator 301. Energy at the sum frequency $f_t$ is generated in transmitter mixer 206, as in Equation 4 above, which in turn is applied through pulse-modulated wide-band RF power amplifier 211, and duplexer 33 to antenna 26. Energy at frequency $f_a$ is also applied to local oscillator mixer 207 where energy at frequency $f_c$, from RF oscillator 303, is heterodyned to produced a summation frequency $f_o$, as in Equation 5 above. Frequency $f_o$ is the local oscillator frequency for the receiver operation as has been hereinbefore fully described.

It can now be seen that three specific embodiments of means for generating high-frequency energy in a series of discrete steps of frequency have been disclosed. The first system incorporates a plurality of separate radar transmitter receivers each operating at a separate frequency and energized sequentially by a control circuit to produce cyclically the desired frequencies. The energy at the frequencies such as $F_1$, $F_2$, $F_3$ excites a linear slotted antenna such as antenna 26, described in more detail hereinafter, so that the energy is transmitted in a beam which has a different direction, such as 45, 46, 47, for each of the frequencies of the energy applied to the antenna 26, and so that echoes are received from targets in an area in any direction illuminated by the transmitted beam. In the second embodiment a single variable frequency oscillator is operated to develop a wave of a frequency maintained constant at each step of frequency by a novel discriminator forming part of an automatic frequency control system. The oscillator is part of a heterodyne system and its output wave is beat with the controlled pulsed output energy from crystal-controlled oscillators to produce the energy at frequencies such as $F_1$, $F_2$, $F_3$. This energy is applied to an antenna as hereinbefore disclosed for transmitting the energy in a beam having a different direction for each of the plurality of frequencies and receiving echoes from targets located in the area illuminated at that instant by the beam. The third embodiment incorporates two fixed frequency RF oscillators which beat with the energy from crystal-controlled oscillators and multiplier chains in a heterodyne system for producing energy at a plurality of frequencies such as $F_1$, $F_2$, $F_3$. This energy is again applied to an antenna as hereinbefore disclosed.

FIG. 5, to which reference is now made, illustrates, by way of example, an antenna which is suitable for antenna 26. The antenna of FIG. 5 is disclosed and claimed in the copending patent application of William B. Hebenstreit, Serial No. 126,007, filed June 3, 1950, and entitled "Microwave Antenna Array." The antenna of FIG. 5 may, for example, be connected to the transmitter of FIG. 1, and the energy developed by the transmitter may be impressed on an input waveguide 403. The antenna comprises a cylinder 401, which is tightly fitted over a screw 402 having a rectangular thread or groove 406. Consequently, the threads 406 constitute with the cylinder 401 a helical waveguide of rectangular cross section. The energy impressed on the input waveguide 403 may be radiated from a linear array of slots 405, which may be of rectangular, circular, or dumbbell shape, as illustrated. Slots 405 are disposed in a portion of the wall of the cylinder 401, which directly faces the center of the concave surface of a parabolic reflector 404. Reflector 404 may be supported, for example, by a supporting bracket 407 secured to the top of antenna 401 and by a bent portion of input waveguide 403. The slots 405 are positioned in the wall of cylinder 401 to extend across each groove or thread portion 406. Consequently, energy impressed on the waveguide 403 is radiated from the slots 405.

As explained in the introductory portion of this application, the spacing $a$ corresponds to the distance between the upper edges of adjacent slots 405 as indicated. The distance $s$ corresponds to one turn of the helical path formed by the groove 406 of screw 402 and hence represents the space along the helical waveguide between a pair of adjacent slots. In this manner, the ratio $s/a$ is established which in turn determines the direction of the beam transmitted by antenna 401, as indicated by arrow 407. The antenna of FIG. 5 is oriented to provide elevational scanning; however, it is obvious that the antenna may be rotated through an angle of 90° to provide scanning in azimuth.

The system of this invention may be employed to stabilize the direction of a radar beam with respect to coordinates in space so as to correct for rolling and pitching motion of the antenna structure mounted on a ship or aircraft. Assuming the system of FIG. 1 be employed for such purpose, voltages representative of the vertical position of the ship or aircraft developed in the gyro stabilizer systems of the ship or aircraft may be utilized to adjust the direction of the transmitted beam so that the beam wil always be directed in the desired direction regardless of the voltage or pitching of the antenna.

The effect of rolling of a ship on the direction of a transmitted beam is illustrated in FIGS. 6 to 8, to which reference is now made.

In FIG. 6 there is illustrated a ship 501 with a radar antenna 502 mounted on its mast. This antenna is physically fixed in the vertical direction and is mechanically rotated in a horizontal direction (in azimuth) on its mast support. When the ship rides in a calm sea, the antenna 502, such as the one described above, transmits a beam in a direction 503, approximately parallel with the surface of the water. The beam is capable of being electronically controlled to scan over some predetermined vertical angle illustrated by the arrow arc 504. The system of FIG. 1 may be employed to perform the scanning operation in the manner previously disclosed. An additional circuit 510, shown in FIGS. 1, 2, and 4, including the sources of the error voltages generated in the gyro stabilizer systems of the ship, is coupled to the controlling circuit of one of the systems of this invention. The centerline 505 of the antenna 502 is shown perpendicular to the antenna. In FIG. 7, the same ship, 501 is illustrated which, however, has now rolled to port 30°. The dotted beam 503 shows that, had the beam direction been uncorrected, it would now be pointing into the water. In accordance with this invention, the hereinbefore noted error voltage derived from the ship's vertical gyro stabilizer is applied to the gating circuit 39 (FIG. 1) to energize the appropriate transmitter-receiver system such as 51, 52, or 53 of FIG. 1 that will provide a beam direction as shown at 506, which will point the beam in a horizontal direction.

In FIG. 8 there is shown the ship 501 which has rolled to starboard to bring an uncorrected beam upward from the horizontal as shown by the dotted beam 503. The beam direction if corrected, as pointed out in connection with the discussion of FIG. 7 to cause transmission of a beam in a direction having a greater angle downward, will produce a resultant beam direction 507 parallel with the surface level. Although not shown in FIGS. 6 to 8, it will be quite apparent that a similar correction may be applied for pitching of a ship, that is, rotation of the ship about a transverse axis amidships.

A similar correction of the beam direction may be effected in an aircraft having an antenna. Referring now to FIG. 9, an aircraft 601 is engaged in ground mapping by radar pulses transmitted from an antenna 603 fixed in the undersurface of the aircraft so that the transmitted beam points in the straight downward direction an shown at 604. The contour of the scanning beam 602 over the area being mapped is deliberately skewed, as shown. In level flight, as shown by arrow 605, no correction voltages will be applied to the gating circuit 39 of FIG. 1, to the staircase voltage generator 208 of FIG. 2, or to the commutator gate circuit 309 of FIG. 4. As long as the aircraft 601 continues in level flight, as shown by arrow 605, the beam 602 will be transmitted in the direction 604.

FIG. 10 represents the same aircraft 601 pitching in a direction pointing upward, as shown by arrow 611, which causes the fixed antenna 603 to point in the direction shown at 604, requiring a correction of the beam 606 to point downward with respect to the axis of the aircraft which corresponds to the direction of flight shown at 605. The correction of the beam direction is accomplished, as hereinbefore disclosed, by the application of the gyro error voltages developed within the aircraft during pitching. Consequently, the beam now points in the correct direction as shown at 606.

In FIG. 11 the condition of level flight is shown for an aircraft engaged in radar ground mapping whereby the fixed antenna 603 produces a skewed beam 607 having a general downward direction 609. During this condition of flight, no correction voltages are developed. Should the aircraft 601, as shown in FIG. 12, roll about the longitudinal axis of the aircraft, as illustrated, the fixed antenna 603 will transmit a beam pointing in the direction 609 requiring a correction to the direction of the beam shown at 610. This correction is again accomplished, as hereinbefore described, by the application of appropriate gyro error voltages to the appropriate control circuits 39, 209, or 309 of the electronically controlled scanning radar system.

There is shown in FIG. 13 a curve 703 representing the shift in beam direction as a function of frequency of the energy impressed on an antenna of a system such as disclosed in FIG. 1. It can be seen that the beam direction can be made to rotate through an angle of approximately 90° with such a system, employing an antenna such as shown in FIG. 5, for a range of frequencies from approximately 8,500 megacycles (mc.) to approximately 9,600 mc. Hence, for this frequency range scanning over 90° may be accomplished by electronic means. It is further evident from this graph that a reasonably linear relationship between the frequency variation of the applied energy and the resulting rotation of the beam direction can be obtained. This graph should be considered representative of results obtainable for the frequency range indicated. Results substantially similar are to be anticipated in other frequency ranges.

The systems of this invention may also be employed in airport surveillance radar installations. Such conventional installations, presently in use for surveillance of an area entirely surrounding an airport in all directions, require massive equipment rotated by heavy machinery. It has been shown how radar scanning may be accomplished over wide angles without requiring motion of the antenna structure of the radar installation. The electronic scanning technique of this invention eliminates the requirement for a heavy prime mover.

In FIG. 14 an airport surveillance system is shown incorporating a frequency step RF generator 803 coupled to a multiplexer and band pass filter 802. The frequency step RF generator 803 is controlled by a frequency step control circuit 816 which is coupled thereto. Multiplexer 802 is coupled through four output circuits respectively, to four duplexer-receivers generally indicated by dotted blocks, 808, 809, 810, 811. Each of the duplexer-receivers 808, 809, 810, 811 incorporates the same elements which are designated for block 808 by certain reference characters, as hereinafter noted, and by corresponding prime, double prime and triple prime numbers for the identical units in the other three duplexer-receivers 809, 810, and 811, respectively.

A prepulse control circuit 823 is coupled through four output circuits, respectively, to each of four duplexers 826, 826', 826", 826'''. A programmer circuit 822 is coupled through four output circuits, respectively, to local oscillators 817, 817', 817", 817'''. The mixers 818, 818', 818", 818''' and IF amplifiers 819, 819', 819", 819''' within each of the duplexer-receiver blocks 808, 809, 810, 811 are coupled in the manner previously described in connection with the system of FIG. 1. The output of each of the IF amplifiers 819, 819', . . . in each of the four duplexer-receivers 808, 809, 810, 811 is coupled to a common IF and video amplifier 821. IF and video amplifier 821 is coupled to the video presentation system 829 which may incorporate a cathode ray indicator tube 830. The programmer circuit 822 is coupled to the frequency step control circuit 816, to the video presentation system 829, and to the prepulse control circuit 823. A manual sector demand control circuit 828 is coupled to both programmer circuit 822 and to video presentation system 829. Each of the duplexer-receiver systems 808, 809, 810, 811, respectively, is coupled to an antenna 26, 26', 26", 26''' forming an antenna array 801. Each of the antennas 26, 26', . . . points to one of the cardinal compass points: Antenna 26 points north, antenna 26' points east, antenna 26" points south, and antenna 26''' points west.

The operation of the radar airport surveillance system of FIG. 14 may be considered in the light of the operation of the above disclosed systems wherein a frequency step RF generator 803, which may be similar to that, for example, disclosed in the system of FIG. 2, produces radio frequency energy in a series of discrete frequency steps having predetermined frequency ranges which are designated, for the sake of clarity, $f1$—$f2$, $f2$—$f3$, $f3$—$f4$ and $f4$—$f5$. In each of the frequency ranges any predetermined number of frequency steps may be provided but the number of frequency steps must be the same for each of the four frequency ranges. Energy in steps of frequency is generated by the RF generator 803 under the control of frequency step control circuit 816. Frequency step control circuit 816 is in turn controlled by the programmer circuit 822.

To this end programmer circuit 822 develops rectangular gating pulses, each having a predetermined duration equal to ¼ of a cycle of operation during which all four quadrants are scanned. Accordingly, for the duration of each gating pulse, energy at one of the frequency ranges such as $f1$ to $f2$ is generated. The energy output of RF generator 803 is applied to multiplexer 802 which is a composite multiplexer including band pass filters so that the four output circuits thereof are individually responsive to the four frequency bands, as shown in FIG. 14. As energy at frequencies within any particular band of frequencies is generated by generator 803 and applied to the multiplexer-band pass filter 802, the energy will be applied through the appropriate output circuit to the duplexer-receiver responsive to this band of frequencies. For example, if energy within the frequency range $f1$ to $f2$ is generated by generator 803 and applied to multiplexer 802, the energy is applied through the appropriate lead to duplexer 826 of receiver 808. In order that only the particular duplexer-receiver shall operate for which the range of frequencies generated at that instant is intended and over which the receiver is responsive, prepulse control circuit 823, and the programmer circuit 822 operate in conjunction to energize the local oscillator and the duplexer of the duplexer-receiver system to be operated. Simultaneously, the three remaining receivers are blocked by rendering their local oscillators and duplexers inoperative. To this end local oscillator 817, 817', . . . and duplexers 826, 826', . . . are normally inoperative, consequently, during the period when energy at a particular frequency range, such as $f1$ to $f2$, is generated, pulses are applied to both local oscillator 817 and duplexer 826 to render them operative, while the other duplexers and local oscillators remain inoperative.

Considering the operation for one of the frequency ranges, for example the range $f1$ to $f2$, it can be seen that from the multiplexer 802 frequencies $f1$ to $f2$ are applied to the duplexer 826 of receiver 808. For the duration of the period during which energy at frequencies $f1$ to $f2$ is being generated by generator 803, local oscillator 817 is energized as is duplexer 826. Therefore, antenna 26, pointing north, is energized. As the frequency of the energy progresses from $f1$ to $f2$, a beam of energy, transmitted by the antenna 26, will scan from the west side of the northern quadrant on its east side. This process will be repeated when energy at frequencies $f2$ to $f3$ is generated and impressed on antenna 26'. Hence, a beam is transmitted over the eastern quadrant which scans from north to south. Subsequently, energy at frequencies $f3$ to $f4$ will be generated to excite the antenna 26'' to transimt a beam over the southern quadrant. Finally, in the same manner, energy at frequencies $f4$ to $f5$ will excite the antenna 26''' to transmit a beam over the western quadrant.

Frequency step control circuit 816 provides output signals which are applied to frequency step generator 803 and are similar to the step frequency wave shown in FIG. 1a. However, it will have as many or more frequency steps for each cycle of operation, as does the wave of FIG. 1a. Gating pulses are applied from programmer circuit 822 to prepulse control circuit 823 and to local oscillators 817, 817', . . . and to the presentation system 824. The duration of each gating pulse equals the time during which energy at one of the frequency ranges, such as $f1$ to $f2$, is generated.

Prepulse control circuit 823 also generates gating pulses which correspond in time and occurrence with the local oscillator gate pulses generated by programmer circuit 822. The gating pulses, generated by prepulse control circuit 823, may be opposite in polarity to those developed by programmer circuit 822. The programmer circuit 822 may be considered the master timing generator for the surveillance system. It provides the control signals for the frequency step control circuit 816 and, also, for the prepulse control circuit 823. Programmer circuit 822 also provides sweep and timing signals for the operation of the video presentation system indicator, which may include cathode ray tube 830. Cathode ray tube 830 is arranged so that a quadrant sector of its screen corresponding to the sector of the area being simultaneously scanned by the antenna array 801 will be scanned by the beam of the cathode ray tube 830 under the control of the programmer circuit 822.

Echoes received during the intervals between transmitted pulses for any one of the frequency ranges and, accordingly, from points within one of the quadrants, will be indicated on the appropriate quadrant of the screen of the cathode ray tube 830. Scanning of the cathode ray tube screen over the four quadrants may be accomplished in accordance with the well-known plan position indicator sweep so that illumination of the cathode ray tube screen corresponds to the instantaneous direction of the beam transmitted by any one of the antennas in the four quadrants.

The operator of the airport surveillance system may desire to observe either one particular quadrant, or a portion of any quadrant. For this purpose there is provided a manual sector demand control 828 to manually control the programmer circuit 822 to arrest the frequency step RF generator 803 at any desired one of its steps of frequency so that the system transmits pulsed energy only at that frequency and consequently only in the desired direction of the selected quadrant and receives echoes during the intervals between pulses from the same direction.

Furthermore, manual sector demand control 828 also controls the presentation system 829 to effect reproduction of the received echoes within the quadrant of the screen corresponding to the scanned quadrant of the area surrounding the airport.

The antenna array 801 may be mounted at some central surveillance point so that each antenna 26, 26', . . . is oriented for azimuth scanning. Should vertical scanning be required in addition then appropriate circuits, similar to those heretofore described, coupled to vertically oriented antennas, each associated with one of the four antennas of the antenna array 801, may be provided.

There has been described an antenna surveillance system for sequentially scanning by radar an area surrounding an airport. The scanning of the radar beam is accomplished by applying the principles of this invention to an installation of four antenna systems, each being similar to that described in FIG. 5 and each pointing to a cardinal compass direction for scanning a quadrant of the area in the four compass directions. The four antennas are excited in sequence to effect continuous scanning over a circle surrounding the airport and cyclic scanning may be effected at some predetermined rate.

Another embodiment of the invention, also suitable for an airport surveillance system, is illustrated in FIG. 15. Whereas the system disclosed in FIG. 14 provides cyclic scanning in sequence over the four quadrants of an area surrounding the airport, the system shown in FIG. 15 provides means for simultaneously scanning each of the four quadrants of the area surrounding an airport or other installation. FIG. 15, to which reference is now made, illustrates the system in block form. The frequency step RF generator 803, frequency step control circuit 816, programmer circuit 822, and video presentation system 829, including a cathode ray indicator tube 830 are connected together as described in connection with FIG. 14. Frequency step RF generator 803 is coupled to an RF power divider 901. RF power divider 901 is coupled through four output leads to four duplexers, 906, 906', 906'', 906''', respectively, forming part of four duplexer-receivers, generally shown by the dotted blocks 902, 903, 904, 905. Each of the duplexer-receivers 902, 903, 904, 905 incorporates the same elements; these are designated for block 902 by certain reference characters, as hereinafter noted, and by corresponding prime, double prime, and triple prime numbers for identical units in the other three duplexer-receivers 903, 904, 905, respectively. Frequency step control circuit 816 has an output connection to a common local oscillator 909. Local oscillator 909 is coupled to a local oscillator power divider 910 coupled, in turn, through four output circuits or leads, respectively, to a mixer 907 within duplexer-receiver 902 and also to corresponding mixers 907', 907'', 907''' in the other three duplexer-receivers. Each of the duplexers 906, 906', 906'', 906''', respectively, is coupled to antenna array 801 which is similar to the array of FIG. 14. Each of the mixers 907, 907', ... is respectively coupled to an associated IF and video amplifier 908, 908', 908'', 908'''. The IF and video amplifiers 908, 908', ... are coupled to the video presentation system 829.

The operation of the airport surveillance system of FIG. 15, insofar as the generation of RF energy in a series of frequency steps is concerned, is the same as disclosed in connection with the system of FIG. 2. There is a difference, however, in that the change in frequency of the local oscillator 909 is also under the control of the frequency step control circuit 816. During any frequency step of the output energy of RF generator 803, the local oscillator 909 operates at a frequency differing from the frequency of the RF generator 803 by an amount equal to the intermediate frequency. Both the RF generator 803 and the local oscillator 909 operate into respective power dividers 901 and 910. From the RF power divider 901 the RF energy generated by frequency step RF generator 803 is applied simultaneously to the four duplexers 906, 906', .... Energy at the local oscillator frequency is applied by the local oscillator power divider 910 simultaneously to the four mixers 907, 907', .... The frequency step RF generator 803, in conjunction with frequency step control circuit 816, corresponds to the generator portion of the system of FIG. 2 including the RF power amplifier 211. The output energy from frequency step RF generator 803, as applied to RF power divider 901, is pulsed as hereinbefore described.

In response to timing signals generated by the programmer circuit 822 and applied in synchronism and simultaneously to frequency step control circuit 816 and to video presentation system 829, frequency step control circuit 816 operates in the manner previously described to control frequency step RF generator so that pulsed energy at a series of discrete steps of frequency is generated by the generator 803. Simultaneously, frequency step control circuit 816 also operates in a similar manner to control the frequency of local oscillator 909 to generate continuous wave energy in a series of steps of frequency differing from the simultaneously occurring RF generator frequency by an amount equal to the intermediate frequency. The energy generated by frequency step RF generator 803 is divided by RF power divider 901 equally and applied to the four duplexers 906, 906', .... The energy generated by the local oscillator 909 is divided by the local oscillator power divider 910 equally and applied to the four mixers 907, 907', .... Through the four duplexers 906, 906' ... the pulsed RF energy is applied to antennas 26, 26', ... simultaneously, for transmission in four simultaneous beams, each having the same frequency, and each scanning over an arc for each antenna in response to the frequency of the applied energy. Each of the four simultaneous beams radiated from the four antennas is directed at any instant during any scanning cycle in a direction 90° rotated from the direction of the beam radiated from an adjacent antenna.

The cathode ray tube 830 may be a special tube having means for producing four electron beams and four deflection systems or it may be a single gun cathode ray tube. In the event that cathode ray tube 830 has four electron guns, the video presentation system will incorporate four complete sets of deflection circuits operating simultaneously in synchronism with and under the control of programmer circuit 822. In the event that cathode ray tube 830 includes a single gun, the video presentation system 829 will incorporate four sweep and deflection circuits controlled by an electronic switch for rapidly and cyclically switching the output signals from the four deflection circuits to the single gun cathode ray tube 830. Hence, the electron beam or beams of the cathode ray tube 830 will scan the four quadrants of the screen surface corresponding at any instant to the directions of the beams radiated from the antenna array 801. In any event the display appearing on the screen of cathode ray tube 830 will be divided into four quadrants appearing to the observer to simultaneously exhibit the quadrant areas scanned by the antenna array 801.

What is claimed is:

1. A radar scanning system comprising means for generating pulsed high-frequency energy in discrete frequency steps; antenna means coupled to said generating means for radiating said high-frequency energy in a beam having a direction stepwise variable over a predetermined scanning sector in response to each of said discrete frequency steps and for receiving echoes of said radiated beam; receiving means coupled to said antenna and responsive to said echoes; and control means coupled to said generating means and to said receiving means for cyclically shifting the frequency of said energy generated by said generating means in successive discrete steps of frequency, each frequency step having a predetermined duration, to vary the direction of said beam in discrete steps in accordance with said frequency steps and for rendering said receiving means responsive at any instant to echoes having the same frequency as that of said radiated beam.

2. In a moving craft, having a predetermined position in space, a radar scanning system comprising means for generating pulsed high-frequency energy; an antenna mounted in a fixed position on the craft and coupled to said generating means for radiating said high-frequency energy in a beam having, at any instant, a predetermined direction in space, and for receiving echoes of said radiated beam, said beam direction being variable in response to variations of the frequency of said energy; receiving means coupled to said antenna and responsive to said echoes; control means coupled to said generating means and to said receiving means for cyclically shifting the frequency of said energy generated by said generating means in successive steps, each step having a predetermined duration, to vary the direction of said beam in accordance with said steps and for rendering said receiving means responsive, at any instant, to echoes having the same frequency as that of said radiated beam; and an error signal generator coupled to said control means, said error signal generator developing error signals representative of deviations of the craft from said predetermined position, said error signals being applied to said control means for shifting the frequency of the energy impressed on said antenna so as to correct the direction in space of said beam transmitted by said antenna to maintain the predetermined direction of said beam, at that instant, despite deviations of the craft from said predetermined position.

3. A radar scanning system comprising a plurality of transmitter-receivers, each of said transmitter-receivers including a generator of pulsed high-frequency energy, the frequencies of the energy developed by each of said generators being fixed and different from each other by discrete steps of frequency, and a receiver for receiving energy at the frequency developed by its associated generator; common control means coupled to said transmitter-receivers for energizing the generators of said transmitter-receivers in predetermined sequence and for energizing each of said generators for a predetermined interval of time; antenna means for radiating said high-frequency energy in a beam having a direction stepwise variable over a predetermined scanning sector in response to said successive steps of the frequency of said energy and for receiving echoes of said radiated beam; and a common multiplexing network cyclically coupling each of said transmitter-receivers to said antenna for impressing said energy on said antenna according to said discrete steps of frequency.

4. In a moving craft, having a predetermined position in space, a radar scanning system comprising a plurality of transmitter-receivers, each of said transmitter-receivers comprising a generator of pulsed high-frequency energy, the frequencies of the energy developed by each of the said generators being fixed and different from each other, and a receiver for receiving energy at the frequency developed by its associated generator; common control means coupled to said transmitter-receivers for energizing the generators of said transmitter-receivers in a predetermined sequence and for energizing each of said generators for a predetermined interval of time; an antenna mounted in a fixed position on the craft for radiating said high-frequency energy in a beam having, at any instant, a predetermined direction in space, and for receiving echoes of said radiated beam, said beam direction being variable in response to variations of the frequency of said energy; a common multiplexing network coupling said transmitter-receivers to said antenna for impressing said energy on said antenna; and an error voltage generator coupled to said control means, said error voltage generator developing error voltages representative of deviations of the craft from said predetermined position, said error voltage being applied to said control means to shift the frequency of the energy impressed on said antenna so as to correct the direction in space, at that instant, of said beam transmitted by said antenna to maintain the predetermined direction of said beam despite deviations of the craft from said predetermined position.

5. A radar scanning system comprising means for generating pulsed high-frequency energy in discrete frequency steps including at least an oscillator variable in steps of frequency; an antenna for radiating said high-frequency energy in a beam having a direction stepwise variable over a predetermined scanning sector in response to said discrete frequency steps and for receiving echoes of said radiated beam; a duplexer network coupling said generating means to said antenna; receiving means coupled to said duplexer network and responsive to said echoes; and control means coupled to said generating means and to said receiving means for cyclically shifting the frequency of said energy generated by said generating means in successive discrete steps, each discrete step having a predetermined duration, to vary the direction of said beam in discrete steps in accordance with said frequency steps and for rendering said receiving means responsive, at any instant, to echoes having the same frequency as that of said radiated beam.

6. In a moving craft, having a predetermined position in space, a radar scanning system comprising means for generating pulsed high-frequency energy including at least a variable oscillator; an antenna mounted in a fixed position on the craft for radiating said high-frequency energy in a beam having, at any instant, a predetermined direction in space, and for receiving echoes of said radiated beam, said beam direction being variable in response to variations of the frequency of said energy; a duplexer network coupling said generating means to said antenna; receiving means coupled to said duplexer network and responsive to said echoes; control means coupled to said generating means and to said receiving means for cyclically shifting the frequency of said energy generated by said generating means in successive steps, each step having a predetermined duration, to vary the direction of said beam in accordance with said steps and for rendering said receiving means responsive at any instant to echoes having the same frequency as that of said radiated beam; and an error signal generator coupled to said control means, said error signal generator developing error signals representative of deviations of the craft from said predetermined position, said error signals being applied to said control means to adjust the frequency of the energy impressed on said antenna so as to correct the direction in space of said beam transmitted by said antenna to maintain the predetermined direction of said beam, at that instant, despite deviations of the craft from said predetermined position.

7. A radar scanning system comprising means for generating pulsed high-frequency energy in discrete frequency steps; a first mixer; said generating means including a variable oscillator, a first crystal-controlled oscillator, both coupled to said first mixer; and an amplifier coupled to said first mixer; an antenna for radiating said high-frequency energy in a beam having a direction stepwise variable over a predetermined scanning sector in response to said discrete frequency steps and for receiving echoes of said radiated beam; a duplexer for coupling said amplifier to said antenna; receiving means including a second mixer, a second crystal-controlled oscillator coupled with said variable oscillator to said second mixer, said receiving means being coupled to said duplexer; control means coupled to said variable oscillator for cyclically shifting the frequency of the energy generated by said generating means in successive discrete steps, each discrete step having a predetermined duration, to vary the direction of said frequency beam in discrete steps in accordance with said steps and for rendering said receiving means responsive, at any instant, to echoes having the same frequency as that of said radiated beam; and means coupled to said crystal-controlled oscillators for alternately energizing said oscillators.

8. The radar scanning system as defined in claim 7 wherein an automatic frequency control circuit is provided for said variable oscillator for maintaining constant the frequency of the energy generated by said variable oscillator during each frequency step, said automatic frequency control circuit being coupled between said variable oscillator and said control means.

9. The radar scanning system as defined in claim 8 wherein said automatic frequency control system includes a multiple response wave guide discriminator for adjusting the frequency of the energy generated by said generating means to correct for any frequency deviation from a predetermined center frequency, during each frequency step, said discriminator comprising a plurality of pairs of resonant chambers, an input wave guide structure, an output wave guide structure, each of said pairs of resonant chambers coupling said input wave guide structure to said output wave guide structure, each of said pairs of resonant chambers being responsive, respectively, to a frequency above and below the predetermined center frequency of one of said frequency steps.

10. A radar scanning system including means for generating high frequency energy in discrete frequency steps; an antenna for radiating a beam of said high frequency energy having a direction stepwise variable in response to said discrete frequency steps and for receiving echoes of said beam; a pulse-modulated amplifier coupled to said generating means; a duplexer network coupling said pulse-modulated amplifier to said antenna; receiving means coupled to said duplexer for receiving echo energy at the frequency generated, at any instant, by said generating means; said generating means including a first fixed-frequency oscillator, a first mixer, said first mixer being coupled between said first oscillator and said pulse-modulated amplifier; said receiving means including a second fixed-frequency oscillator and a second mixer coupled together; means coupled to both of said mixers for impressing thereon a wave having a frequency which varies cyclically at predetermined instants in successive steps from one predetermined discrete value to another, whereby the beam radiated by said antenna has a frequency which varies stepwise from one discrete value to another to change the beam direction in a predetermined sequence of steps and whereby echoes from said beam intercepted by said antenna are received by said receiving means, 11. A radar scanning system including means for generating high frequency energy in discrete frequency steps; an antenna for radiating a beam of said high frequency energy having a direction stepwise variable in response to said discrete frequency steps and for receiving echoes of said beam, a pulse-modulated amplifier coupled to said generating means, a duplexer network coupling said pulse-modulated amplifier to said antenna; receiving means for receiving echo energy at the frequency generated by said generating means at any instant; said generating means comprising a first oscillator for generating energy at a first predetermined fixed frequency, and a first mixer, said first mixer being coupled between said first oscillator and said pulse-modulated amplifier; said receiving means comprising a second oscillator for generating energy at a second predetermined fixed frequency, a second mixer, and a receiver mixer, said second mixer being coupled between said second oscillator and said receiver mixer, said receiver mixer being coupled to said duplexer network, a plurality of crystal-controlled oscillators; an output amplifier having its output coupled to said first and said second mixers; a commutating gate circuit for sequentially gating each of said crystal-controlled oscillators and for coupling each of said crystal-controlled oscillators to said output amplifier in a predetermined sequence for a predetermined time interval, whereby the energy of said first oscillator and the energy derived at any instant from said output amplifier are mixed in said first mixer and applied to said antenna for transmission in a beam having a predetermined direction determined by the frequency of the energy being transmitted at that instant, and whereby the energy of said second oscillator and the energy derived at any instant from said output amplifier are mixed in said second mixer to provide energy applied to said receiver mixer.

12. A radar surveillance system comprising generating means for generating pulsed high-frequency energy in discrete frequency steps; stationary scanning means including a plurality of antennas, each of said antennas radiating a beam of energy in predetermined discrete and different directions from said surveillance system, each said beam of energy being stepwise variable in direction in response to said discrete frequency steps generated by said generating means and for receiving echoes of said beam; coupling means for coupling said stationary scanning means to said generating means; receiving and indicating means coupled through said coupling means to said scanning means for receiving echo energy at the frequency radiated at that instant by said scanning means, and indicating said echoes in relation to targets reflecting said scanning beam and located in the area illuminated thereby; control means coupled to said generating means and to said receiving and indicating means for controlling the frequency of the energy of said generating means cyclically at predetermined instants in steps from one predetermined discrete value to another and for rendering said receiving and indicating means responsive to the echoes of the energy radiated at that instant; whereby said scanning means radiates a beam which cyclically changes its direction in discrete steps and whereby said receiving means receives echoes of targets illuminated by said beam and indicates the direction of said target on said indicating means.

13. A radar surveillance system comprising means for generated pulsed high-frequency energy in discrete frequency steps; an antenna array including a plurality of antennas, each radiating a beam of energy in a predetermined discrete and different direction stepwise variable in response to said discrete frequency steps generated by said generating means, and for receiving echoes of said beam; a plurality of duplexer networks, each being coupled to one of said antennas; a multiplexing network coupling said generating means to each of said duplexer networks; a plurality of receivers, each being coupled to one of said duplexers; a visual presentation system; a video amplifier coupling said presentation system to each of said receivers; and control means coupled to said generating means, to said duplexers, and to said receivers for cyclically and stepwise varying the frequency of the energy generated by said generating means at predetermined intervals, from one predetermined discrete value to another, for sequentially connecting a predetermined one of said duplexers to its associated antenna to apply said energy to said associated antenna, during each of said predetermined intervals, for coupling the associated receiver to said associated antenna during periods between pulses of energy generated by said generating means, for receiving echoes of energy representative of targets reflecting said beam and located in the area illuminated by said beam of energy at the same frequency generated by said generating means at that instant, and for controlling said presentation system to indicate the direction of said targets in relation to the surveillance system, thereby to provide a radar surveillance system for radiating a beam of energy in a continuous sequence of steps from each of said antennas in succession, said beam continuously moving about the surveillance system installation and for receiving echoes from targets in the area illuminated at any instant by said beam over a 360° area surrounding said installation.

14. A radar surveillance system comprising means for generating pulsed high-frequency energy in discrete frequency steps; an antenna array including a plurality of antennas, each simultaneously radiating a beam of energy generated by said generating means in a predetermined discrete and different direction stepwise variable in response to said discrete frequency steps generated by said generating means, and for receiving echoes of said beam; a plurality of duplexer networks, each being coupled to one of said antennas; a power dividing network coupling said generating means simultaneously to each of said duplexer networks; a plurality of receivers, each being coupled to one of said duplexers; a visual presentation system; a plurality of video amplifiers coupling said presentation system to said receivers; control means coupled to said generating means, to said duplexers and to said receivers for cyclically and stepwise varying the frequency of the energy generated by said generating means at predetermined intervals from one predetermined discrete value to another, for controlling each of said duplexers to apply said energy simultaneously to its associated antenna, during each of said predetermined intervals, for coupling associated ones of said receivers to said antennas during periods between pulses of energy generated by said generating means, for receiving echoes of energy representative of targets reflecting said beams and located in the area illuminated by said beams of energy at the same frequency generated by said generating means at that instant, and for controlling said presentation system to indicate the direction of said targets.

15. In a radar system installed on a moving craft, a system, including an antenna mounted on the craft, for stabilizing the direction of radiation of a beam of energy radiated from said antenna to maintain said beam in a predetermined direction, with respect to space, said system comprising a generator of high-frequency energy; said generator being coupled to said antenna for radiating said energy generated by said generator in a beam having a predetermined direction representative of the frequency of the energy generated by said generator; error signal generating means responsive to the position of the craft in space for producing an error signal representative of changes in position in space of the craft, said error signal generator being coupled to said generator to vary the frequency of the energy generated by said generator, thereby to correct said frequency to change the direction of the beam of energy radiated by said antenna whereby the direction of said beam is maintained in the same predetermined direction despite changes in position of the craft.

References Cited in the file of this patent

UNITED STATES PATENTS

| | | |
|---|---|---|
| 2,428,427 | Loughren | Oct. 7, 1947 |
| 2,433,804 | Wolff | Dec. 30, 1947 |
| 2,576,833 | Goodall | Nov. 27, 1951 |
| 2,640,922 | McArthur | June 2, 1953 |
| 2,664,522 | Page | Dec. 29, 1953 |

UNITED STATES PATENT OFFICE
CERTIFICATE OF CORRECTION

Patent No. 3,017,630                          January 16, 1962

Nicholas A. Begovich et al.

It is hereby certified that error appears in the above numbered patent requiring correction and that the said Letters Patent should read as corrected below.

Column 7, line 64, for "pulse-modualte" read -- pulse-modulate --; line 67, after "antenna" insert -- 26 --; line 68, for "frequepncy" read -- frequency --; column 12, line 49, strike out "pairs of resonant chambers to maintain each of the three"; column 14, line 70, for "wil" read -- will --; column 16, line 2, for "209" read -- 208 --; column 17, line 57, "on" read -- to --; line 63, for "transimt" read -- transmit --.

Signed and sealed this 24th day of July 1962.

(SEAL)
Attest:

ERNEST W. SWIDER                              DAVID L. LADD
Attesting Officer                                 Commissioner of Patents